United States Patent
Shahul Hameed et al.

(10) Patent No.: US 12,081,569 B2
(45) Date of Patent: Sep. 3, 2024

(54) GRAPH-BASED ANALYSIS OF SECURITY INCIDENTS

(71) Applicant: Microsoft Technology Licensing, LLC, Redmond, WA (US)

(72) Inventors: Nisha Shahul Hameed, Seattle, WA (US); Rishi Dev Jha, Bellevue, WA (US); Evan John Argyle, Salt Lake City, UT (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 17/681,531

(22) Filed: Feb. 25, 2022

(65) Prior Publication Data
US 2023/0275912 A1   Aug. 31, 2023

(51) Int. Cl.
*H04L 9/40* (2022.01)
*H04L 41/14* (2022.01)
*H04L 41/16* (2022.01)

(52) U.S. Cl.
CPC .......... *H04L 63/1425* (2013.01); *H04L 41/14* (2013.01); *H04L 41/16* (2013.01)

(58) Field of Classification Search
CPC ......... H04L 41/12; H04L 67/10; H04L 45/02; H04L 43/12; H04L 63/1441; H04L 63/1425; H04L 41/14; H04L 41/16
See application file for complete search history.

(56) References Cited

U.S. PATENT DOCUMENTS

| | | |
|---|---|---|
| 6,832,245 B1 | 12/2004 | Isaacs |
| 7,668,843 B2 | 2/2010 | Ertoz et al. |
| 8,566,328 B2 | 10/2013 | Tseng et al. |
| 8,577,895 B2 | 11/2013 | Gupta et al. |

(Continued)

FOREIGN PATENT DOCUMENTS

EP   3731489 A1   10/2020

OTHER PUBLICATIONS

Doynikova et al., "Enhancement of probabilistic attack graphs for accurate cyber security monitoring," 2017 IEEE SmartWorld, (SmartWorld/SCALCOM/UIC/ATC/CBDCom/IOP/SCI) Year: 2017 | Conference Paper | Publisher: IEEE.*

(Continued)

*Primary Examiner* — Roderick Tolentino
(74) *Attorney, Agent, or Firm* — Schwegman Lundberg & Woessner, P.A.

(57) ABSTRACT

In network security systems, graph-based techniques can be used to analyze data collected for a particular security incident, e.g., a command-and-control incident. In example embodiments, data extracted from data records of network activity and/or security alerts is used to generate a multipartite graph in which different entities (e.g., machines, processes, and domains or IP addresses) are represented as different types of nodes and relationships between the entities are represented as edges. The multipartite graph may be clustered, and the clusters be ranked according to some indicator of maliciousness (e.g., the number of associated security alerts or indicators of compromise (IoCs)). An output generated from the highest-ranking cluster(s) may serve, e.g., to identify new IoCs, or flow into mitigating actions taken in response to the incident.

20 Claims, 4 Drawing Sheets

(56) References Cited

U.S. PATENT DOCUMENTS

| | | | |
|---|---|---|---|
| 9,038,180 | B2 | 5/2015 | Neil |
| 9,070,120 | B2 | 6/2015 | Efrati et al. |
| 9,288,240 | B2 | 3/2016 | Sylvain |
| 9,292,695 | B1 | 3/2016 | Bassett |
| 9,374,380 | B2 | 6/2016 | Neil et al. |
| 9,444,836 | B2 | 9/2016 | Wright et al. |
| 9,800,605 | B2 | 10/2017 | Baikalov et al. |
| 10,193,913 | B2 | 1/2019 | Machlica et al. |
| 11,201,890 | B1* | 12/2021 | Coull .................. G06F 16/9024 |
| 11,271,865 | B1 | 3/2022 | Haimovich et al. |
| 11,343,355 | B1* | 5/2022 | Goela ..................... H04L 67/75 |
| 11,792,284 | B1* | 10/2023 | Nanduri .................. G06F 9/542 709/224 |
| 11,961,021 | B2* | 4/2024 | Paturi ..................... G06Q 10/06 |
| 2006/0209690 | A1 | 9/2006 | Brooke |
| 2008/0147639 | A1 | 6/2008 | Hartman et al. |
| 2009/0186597 | A1 | 7/2009 | Lin et al. |
| 2012/0246245 | A1 | 9/2012 | Nilsson |
| 2012/0331418 | A1 | 12/2012 | Bonforte |
| 2014/0052742 | A1 | 2/2014 | Deng et al. |
| 2014/0295808 | A1 | 10/2014 | Ely et al. |
| 2017/0228277 | A1 | 8/2017 | Cheng et al. |
| 2018/0336437 | A1 | 11/2018 | Cheng et al. |
| 2018/0343272 | A1 | 11/2018 | Khalil et al. |
| 2018/0351971 | A1 | 12/2018 | Chen et al. |
| 2019/0182281 | A1 | 6/2019 | Neil et al. |
| 2019/0379684 | A1 | 12/2019 | Brown et al. |
| 2020/0076841 | A1 | 3/2020 | Hajimirsadeghi et al. |
| 2020/0167785 | A1* | 5/2020 | Kursun ................. H04L 43/045 |
| 2020/0310662 | A1* | 10/2020 | Staab ...................... G06F 21/44 |
| 2020/0349586 | A1 | 11/2020 | Deng et al. |
| 2021/0194907 | A1 | 6/2021 | Bertiger et al. |
| 2021/0406365 | A1 | 12/2021 | Neil et al. |
| 2022/0138261 | A1* | 5/2022 | Ogrinz ................ G06F 16/9038 707/798 |
| 2022/0224724 | A1* | 7/2022 | Bazalgette .......... H04L 63/1425 |
| 2022/0385673 | A1 | 12/2022 | Dong et al. |
| 2023/0053182 | A1 | 2/2023 | Bertiger et al. |
| 2023/0071119 | A1* | 3/2023 | Wolf ........................ G06N 7/01 |
| 2023/0088676 | A1* | 3/2023 | She ........................ G06N 3/088 706/25 |

OTHER PUBLICATIONS

Yang et al., "Research on airspace security risk assessment technology based on knowledge Graph," 2021 IEEE 21st International Conference on Software Quality, Reliability and Security Companion (QRS-C) Year: 2021 | Conference Paper | Publisher: IEEE.*

Akoglu, et al., "Graph-Based Anomaly Detection and Description: A Survey", In Repository of arXiv:1404.4679v1, Apr. 18, 2014, pp. 1-68.

Boden, et al., "Mining Coherent Subgraphs in Multi-Layer Graphs with Edge Labels", In Proceedings of the 18th ACM SIGKDD International Conference on Knowledge Discovery and Data Mining, Aug. 12, 2012, pp. 1258-1266.

Chaudhary, et al., "Anomaly Detection Using Graph Neural Networks", In Proceedings of International Conference on Machine Learning, Big Data, Cloud and Parallel Computing, Feb. 14, 2019, pp. 346-350.

Cheema, et al., "Network Security Using Graph Theory", In International Journal of Innovations in Engineering and Technology, vol. 2, Issue 3, Jun. 2013, pp. 131-138.

Chickering, et al., "Selective Greedy Equivalence Search: Finding Optimal Bayesian Networks Using a Polynomial Number of Score Evaluations", In Technical Report MSR-TR-2015-45 of Microsoft Research, Jun. 2015, 16 Pages.

Deng, et al., "Graph Neural Network-Based Anomaly Detection in Multivariate Time Series", In Proceedings of Thirty-Fifth AAAI Conference on Artificial Intelligence, vol. 35, Issue 5, Feb. 2, 2021, pp. 4027-4035.

Dunlavy, et al., "Temporal Link Prediction Using Matrix and Tensor Factorizations", In Journal of ACM Transactions on Knowledge Discovery from Data (TKDD), vol. 5, Issue 2, Article 10, Feb. 1, 2011, 27 Pages.

Eberle, et al., "Insider Threat Detection Using Graph-Based Approaches", In Journal of Applied Security Research, vol. 6, Issue 1, Jan. 3, 2011, pp. 32-81.

Gu, et al., "Statistical Analysis of Nearest Neighbor Methods for Anomaly Detection", In Proceedings of 33rd Conference on Neural Information Processing Systems, Dec. 8, 2019, 11 Pages.

Hallberg, et al., "Creating Dynamic Groups using Context-awareness", In Proceedings of the 6th International Conference on Mobile and Ubiquitous Multimedia, Dec. 12, 2007, pp. 42-49.

Hewapathirana, Isuruu. , "Change Detection in Dynamic Attributed Networks", In Repository of arXiv:2001.04734v1, Jan. 14, 2020, 39 Pages.

Ide, et al., "Eigenspace-Based Anomaly Detection in Computer Systems", In Proceedings of the Tenth ACM SIGKDD International Conference on Knowledge Discovery and Data Mining, Aug. 22, 2004, pp. 440-449.

Juszczyszyn, et al., "Motif-Based Attack Detection in Network Communication Graphs", In Proceedings of 12th IFIP International Conference on Communications and Multimedia Security, Oct. 19, 2019, 8 Pages.

Leichtnam, et al., "Forensic Analysis of Network Attacks: Restructuring Security Events as Graphs and Identifying Strongly Connected Sub-graphs", In Proceedings of 5th International Workshop on Traffic Measurements for Cybersecurity and European Symposium on Security and Privacy Workshops, Sep. 7, 2020, 9 Pages.

Liu, et al., "Fraud Detection Using Graph Topology and Temporal Spikes", In Proceedings of the 13th International Workshop on Mining and Learning with Graphs, Aug. 14, 2017, 8 Pages.

Menon, et al., "Link Prediction via Matrix Factorization", In Proceedings of the European Conference on Machine Learning and Knowledge Discovery in Databases, Sep. 5, 2011, pp. 437-452.

Mookiah, et al., "Detecting Suspicious Behavior Using a Graph-Based Approach", In Proceedings of IEEE Symposium on Visual Analytics Science and Technology, Nov. 9, 2014, pp. 357-358.

Mussmann, et al., "Graph Search Algorithms", Retrieved From: https://web.archive.org/web/20170329085355/https://cs.stanford.edu/people/abisee/gs.pdf, Mar. 29, 2017, 48 Pages.

Passino, Francescos. , "Latent Factor Representations of Dynamic Networks with Applications in Cyber-Security", Thesis submitted in partial fulfilment of the requirements for the degree of Doctor of Philosophy in Statistics, Imperial College London, Oct. 2020, 206 Pages.

"International Search Report and Written Opinion Issued in PCT Application No. PCT/US2023/010899", Mailed Date: May 8, 2023, 15 Pages.

Phillips, et al., "A Graph-Based System for Network-Vulnerability Analysis", In Proceedings of the Workshop on New Security Paradigms, Sep. 22, 1998, pp. 71-79.

Rohe, et al., "Co-Clustering Directed Graphs to Discover Asymmetries and Directional Communities", In Proceedings of the National Academy of Sciences, vol. 113, Issue 45, Nov. 8, 2016, p. 12679-12684.

Sussman, et al., "A Consistent Adjacency Spectral Embedding for Stochastic Blockmodel Graphs", In Repository of arXiv:1108.2228v3, Apr. 27, 2012, 21 Pages.

Whittaker, et al., "Contact Management: Identifying Contacts to Support Long-Term Communication", In Proceedings of the ACM Conference on Computer Supported Cooperative Work, Nov. 16, 2002, pp. 216-225.

* cited by examiner

GRAPH-BASED ANALYSIS OF SECURITY INCIDENTS

BACKGROUND

Commercial enterprises and other organizations that operate large computer networks typically employ a number of hardware- or software-based network security tools to monitor network communications and activity and guard against cybersecurity threats. These tools generate significant amounts of data, including routine logs of monitored activity as well as security alerts triggered by anomalous or otherwise suspicious activity, which can be analyzed in an effort to detect attacks early and thwart attempted network intrusions, or in the event a breach does occur, to isolate the affected network portions, stop the attack, and prevent future incursions. An important part of the "clean-up" following a breach is the identification of the files, processes, machines, user accounts, etc. within the computer network that implement or are subject to the attack, as well as of the internet protocol (IP) addresses and/or web domains from which the attacker operates. This, however, is not a trivial task, as the relevant information is often buried in data collected for millions or billions of network connections per day. In addition to consuming vast amounts of computational and/or human resources, the clean-up process is therefore sometimes incomplete, leaving the computer network vulnerable to ongoing and future attacks.

DESCRIPTION

Described herein are systems and methods for utilizing graph-based computational methods to analyze security incidents in computer networks, e.g., post-mortem, based on log data of network activity and/or security alerts. A security incident, as herein understood, denotes the interrelated activities occurring as part of a particular attack on an organization, or of a specific phase of the attack, within an associated defined time frame. While not limited in scope to a particular type of attack or phase, the disclosed graph-based approach is of particular practical relevance to command-and-control (C2) attacks or attack phases, where an attacker communicates with one or more compromised machines within a computer network to deliver instructions to control the network and/or collect stolen information.

In various embodiments, graph-based incident analysis involves processing data collected for the computer network of an organization under attack within the time period between start and end points determined for the attack (or, herein synonymously, security incident) to generate a multipartite graph that represents entities within or connected to the computer network (herein collectively "network entities") such as machines within the computer network, processes spawned by the machines, and external network destinations connected to by the processes—as different types of nodes and the relations between them as edges between the nodes. Using one or more graph-based clustering techniques, the multipartite graph is then broken up into clusters, which can be ranked by some metric quantifying the severity of the threat, such as based on the number of security alerts or indicators of compromise (IoCs) associated with each cluster. A listing of the nodes within the highest-ranking cluster or clusters may be provided as output to a security analyst, or to a software tool, to facilitate further analysis and/or inform the selection and/or execution of risk-mitigating actions. For example, among the listed nodes, machines may be disconnected, processes shut down, and external network destinations blocked to curtail the damage resulting from the incident. In addition, previously unknown IoCs may be discovered among the listed nodes. An IoC, as used herein, is any malicious domain, IP address, process, machine, or other network entity that serves as evidence that a breach has occurred and the computer system is compromised. Examples of IoCs include, without limitation, virus signatures, URLs or domains of C2 servers in communication with the infected machines of the monitored network, and file hashes of malware files.

Beneficially, in contrast to many conventional threat-detection methods that focus on extracting IoCs from configurations or detecting anomalous connections, the presently disclosed approach, by modeling relationships between different entities within or in communication with the monitored computer network (e.g., including machines, processes, and external IP addresses and/or domains) as a mathematical graph, allows leveraging useful network relations to detect more subtle IoCs. In particular, it has been observed that these relationships strongly cluster attacker activity, enabling the efficient detection of IoCs associated with additional modes of attack ("attack vectors") with high precision and recall, which in turn helps plug vulnerabilities otherwise left open. Also, the multipartite graph naturally lends itself to the detection of indicator triads (or, more generally, groups of two or more connected entities) reflecting problematic relationships between entities as opposed to individually problematic entities, allowing for more targeted mitigating actions, such as blocking only specific, problematic network connections, rather than entire services that may also have legitimate connections. For example, graph-based analysis may allow differentiating between a browser within the computer network that connects to an external website to serve content to a user and a malicious process running within the computer network that connects to an external website to verify network connectivity. As another example, in situations where IP addresses are reassigned frequently (e.g., by an internet service provider), contextual information from graph-based analysis may help distinguish between an attack involving the connection to a given IP address on one day, and a benign connection to the same IP address on another day.

Furthermore, as compared with supervised machine learning approaches to extracting information from the graph, the use of unsupervised clustering methods in accordance with some embodiments benefits from low model overhead (as no labels and no training are needed) and quick execution times. Since security analysts need not have any prior knowledge (e.g., as would be reflected in training labels) about an incident to derive meaningful insights, the graph-based analysis is not limited to incidents similar or related to previously detected incidents, but can be straightforwardly generalized to a diverse set of incidents. Additionally, the multipartite graph can be readily extended by additional entities, relationships, and/or associated attributes, allowing new modes of information to be added and removed efficiently and at will (without any need for model training) to explore the best set of information to be utilized for a specific problem.

Figure 1:
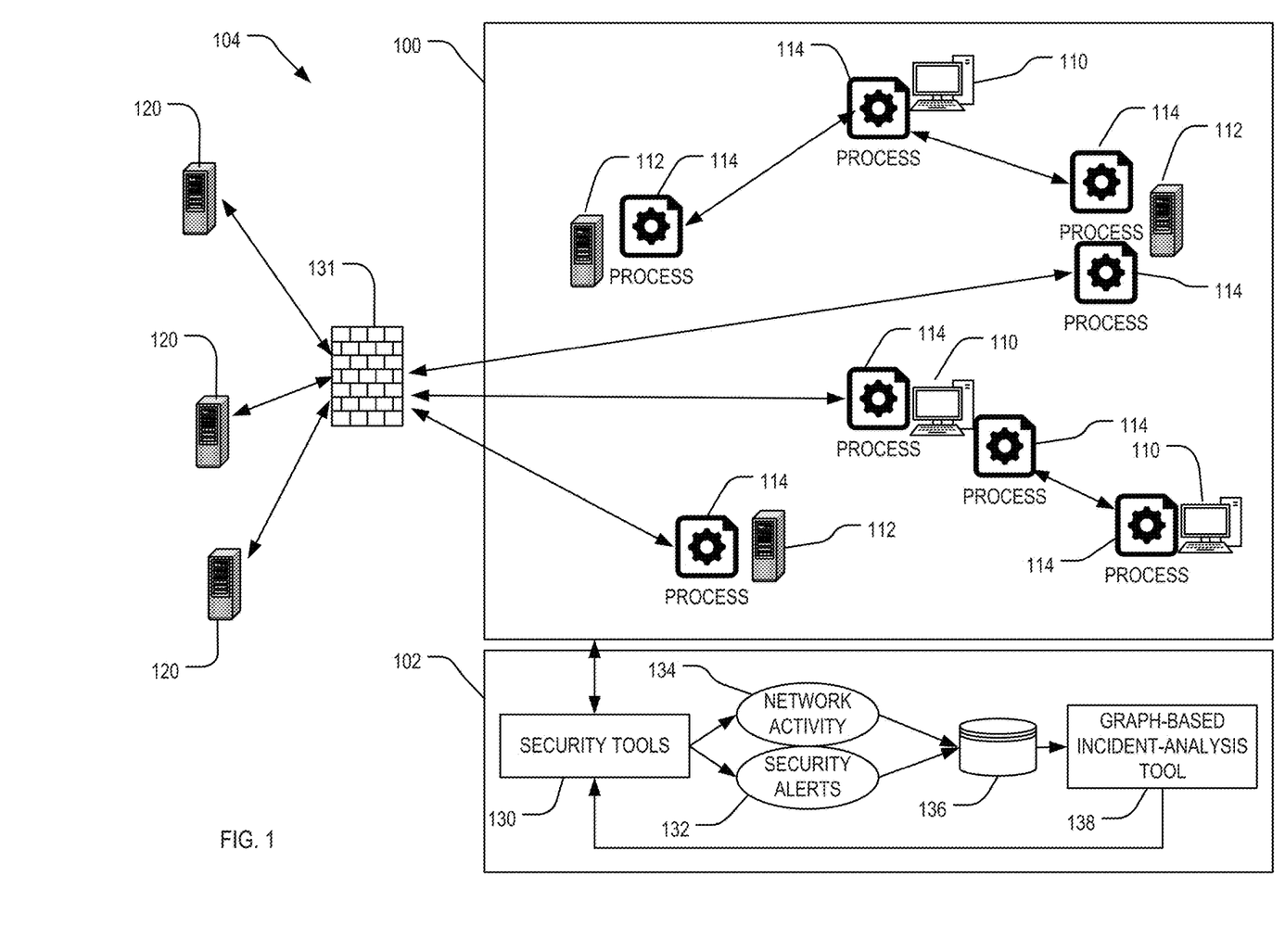
FIG. 1 is a block diagram conceptually illustrating an example computer network and associated security system in the context of their network environment, in accordance with various embodiments.

FIG. 1 is a block diagram conceptually illustrating an example computer network 100 and associated security system 102 in the context of their network environment 104, in accordance with various embodiments. As shown, the computer network 100, which may implement, e.g., the intranet of a commercial enterprise or other organization, includes machines 110, 112, as well as processes 114 spawned and files (e.g., documents, media files, program and configuration files, etc.) stored by the machines 110, 112. The machines may include both endpoint devices 110 accessible by users (e.g., desktop or laptop computers, tablets, smartphones, or other mobile devices, and Internet-of-things devices) and servers 112. Each machine 110 or 112 may include one or more (e.g., general-purpose) processors and associated memory (e.g., as described below with reference to FIG. 4). The machines 110, 112 communicate with each other as well as with machines 120 outside the organization via suitable wired or wireless network connections. In some embodiments, internal communications within the computer network 100 take place via a local area network (LAN) implemented, e.g., by Ethernet or Wi-Fi, or via a private wide area network (WAN) implemented, e.g., via optical fiber or circuit-switched telephone lines. External communications may be facilitated via the Internet, with external network destinations being identified by domain names and/or the IP addresses to which the domains resolve. The computer network 100 may be dynamic in that it includes, in addition to machines that are permanent parts of the computer network 100 (e.g., servers and in-office workstations), also machines that are only temporarily connected to the computer network 100 at a given time (e.g., if a member of an organization, such as an employee of a company, accesses the intranet of the organization from outside the office via a personal device, such as a smartphone).

Network activity and communication within the computer network 100 as well as communications with the external machines 120 are generally monitored by a number of security tools 130, which may be implemented as software tools running on general-purpose computing hardware (e.g., any of the machines 110, 112 within the computer network 100) and/or with dedicated, special-purpose hardware appliances, and may be operated by the owner of the computer network 100 or by a separate, contracted network security provider, for example. In addition to collecting, logging, and analyzing network connection and activity data to detect potential cybersecurity threats, the security tools 130 can also implement obstacles to attackers, as well as perform, automatically or based on input from security analysts, various mitigating actions in response to an attack. Non-limiting examples of security tools 130 that may be used to protect the computer network 100 from unauthorized access, data theft, malware attacks, or other cyberattacks, include: one or more firewalls (e.g., 131) that monitor and control network traffic, e.g., via packet filtering according to pre-determined rules, establishing a barrier between the computer network 100 and the external machines 120, and optionally between various sub-networks of the computer network 100; anti-malware software to detect and prevent and/or remove malware such as computer viruses, worms, Trojan horses, ransomware, spyware, etc.; intrusion detection and prevention systems that scan network traffic to identify and block attacks (e.g., by comparing network activity against known attack signatures); network anomaly detectors to spot malicious network behavior; authentication and authorization systems to identify users (e.g., by multi-factor authentication) and implement access controls; application security tools to find and fix vulnerabilities in software applications; email security tools to detect and block email-born threats like malware, phishing attempts, and spam; data loss prevention software to detect and prevent data breaches by monitoring sensitive data in storage, in network traffic, and in use; and/or endpoint protection systems, which employ a combination of measures to safeguard data and processes associated with the individual computing machines 110, 112 serving as entry points into the computer network 100. In some embodiments, comprehensive protection is provided by multiple security tools bundled into an integrated security suite.

The security tools 130 generally issue security alerts 132 in response to any detected security events; typically, many such alerts 132 are triggered in course of a security incident (corresponding to a single attack). Time-stamped data records of the security alerts 132 and/or of other monitored network activity 134 (whether benign or malicious) may be stored in one or more data repositories 136 for subsequent further analysis. The data repository 136 may be internal to the organization that owns the computer network 100. Alternatively, the data repository 136 may be shared between multiple organizations. For example, a third-party network security provider may operate the repository 136 to collect data from multiple client organizations. In the case of a shared repository 136, the data records may be labeled with an organization identifier (ID) of the organization from which they were collected, or alternatively segregated by organization into separate organization-specific databases.

In accordance with the disclosed approach, a graph-based incident analysis tool 138 can be used to selectively retrieve (sub-)sets of the data records, e.g., all records stored for an organization that fall within a timeframe associated with a detected security incident, to generate a graph representation of the retrieved data, cluster the graph representation, and rank the resulting clusters, e.g., based on the number of associated alerts or IoCs, to home in on one or more clusters of alerts 132 and network activity 134 most relevant to the analyzed incident. The incident analysis tool 138 outputs a listing of the nodes associated with the highest-ranking cluster(s), which can be reviewed by security analysts or further processed automatically, and which may prompt mitigating actions to be performed, e.g., by the security tools 130 (e.g., actions in addition to those triggered by the security alerts 132 themselves). The incident analysis tool 138 may be implemented in software executed by one or more general-purpose processors, optionally aided by hardware accelerators (e.g., graphic processing units (GPUs), field-programmable gate array (FPGA) or application-specific integrated circuit (ASIC)) configured for certain computationally expensive, but repetitive processing tasks), or generally by any suitable combination of software, firmware, and hardware. Like the security tools 130 that generate the data and the data repository 136, the incident analysis tool 138 may generally be implemented with machines of the monitored computer network 100, separate machines under common control and ownership with the monitored computer network 100, or machines operated by a separate network security provider or other third party.

Figure 2:
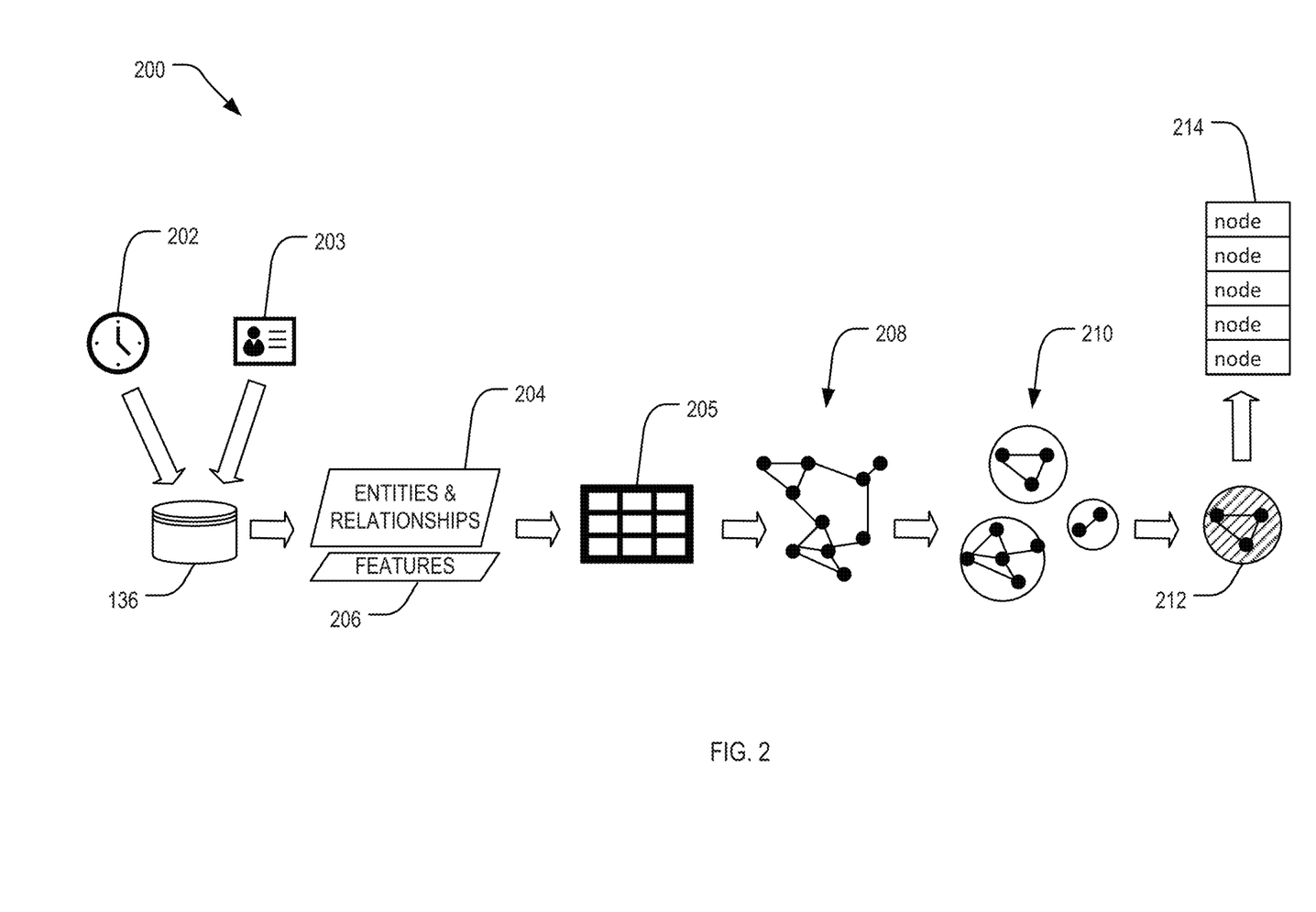
FIG. 2 is a data flow diagram illustrating graph-based security incident analysis in accordance with various embodiments.

FIG. 2 is a workflow diagram illustrating, in more detail, the data flow 200 during graph-based security incident analysis in accordance with various embodiments. The data flow 200 involves data ingestion from a data repository 136 of network activity and security-alert records, using a specified timeframe 202 as an input parameter to access or obtain only data records stored in the data repository 136 that fall within that timeframe 202. The timeframe 202 includes start and end times deemed to correspond to the beginning and end of an attack on an organization. In embodiments in which the repository 136 stores data records across multiple organizations, the identifier of the organization at issue, 203, is provided as an additional input parameter.

In various embodiments, the data flow 200 is executed post-mortem, that is, a fixed set of data as defined by the input parameters 202, 203 is analyzed retroactively after an attack has taken place, e.g., the computer system 100 has been breached and data has been stolen, encrypted, or destroyed. The input parameters 202, 203 may themselves be determined from a post-mortem analysis of the collected security data (such as security alerts and network activity). The earliest detected malicious activity may serve as the start time of the timeframe 202, and termination of the connection between the attacker (e.g., an external C2 server) and the infected machines within the network 100 may constitute the end time. Post-mortem data analysis can be part of the clean-up process, which may involve, e.g., detecting and deleting any malware still residing on the infected machines, resetting passwords and other authentication credentials, removing persistence mechanisms (e.g., registry entries, scheduled tasks, etc.), taking stock of exfiltrated data that could include customer information or trade secrets, restoring destroyed data from back-up copies, fixing any security bugs that allowed the intrusion, and/or notifying authorities if appropriate. Alternatively to post-mortem analysis, the data records may be analyzed while the attack is still ongoing. In this case, a natural choice for the end time of the timeframe 200 is the start time of the analysis. It is also possible to update the analysis dynamically, e.g., by periodically resetting the end time to the current time and retrieving any additional records that have been stored in the intervening time. The analysis of past data records of an ongoing attack may serve to inform acute mitigating actions, e.g., to identify which portions of the computer network 100 to shut down or disconnect presently. Analysis of both past and ongoing attacks can serve to identify IoCs to watch out for in the future, study attack patterns and system vulnerabilities, and the like.

Data ingestion for the incident associated with the specified timeframe and organization may involve extracting, from the relevant data records, data regarding machines, processes, IP addresses, and/or domains associated with network connections. For instance, for each network connection between the computer network of an organization (e.g., computer network 100) and any external network destination (e.g., to any machine 120), a triple or quadruple including the domain and/or IP address of the external network destination, the process that made the connection, and the machine within the computer network 100 that spawned the process is ingested. The consideration of relationships between processes and IP addresses or domains (and, if both are used, the relationship between the domains and the IP addresses they resolve to) helps isolate malicious connections initiated by certain processes, which could be difficult to detect, among connections of a machine to legitimate IP addresses and domains, if only relationships between machines and external IP addresses or domains were considered. Optionally, the extracted data may also include users, file hashes associated with the processes, file signers of the file hashes, sub-processes, security alerts, and/or other types of entities that may help detect suspicious behavior. The collected data may be organized in data tables 205 of entities and associated relationships between pairs of entities (collectively 204) (e.g., machine→process, process→domain, domain→IP address, process→IP address, parent process→child process, user→machine, user→process, process→file hash, file hash→file signer, machine→alert, process alert).

Further, in some embodiments, metadata, or "feature data" 206 associated with the various entities and/or the relationships between them (204) is also gathered and stored in the data tables 206. Features collected for a process may include, e.g., the process name, the age of the process (measured from the time of process creation), the image file age of the process (measured from the time the process image was stored on disk), the compilation age of the process, the file signature status, the process/file size, the type of process (e.g., browser, non-browser), and/or any command line features. Features gathered for a machine may include, e.g., an alert history, the machine type (e.g., server, workstation), and/or the number of users that regularly connect to the machine. Features associated with users may include, e.g., user privileges or security group memberships, the user account age, and/or the number of distinct machines logged onto within a certain time period (e.g., the past week, month, or year). Features for IP addresses or domains may include, e.g., the associated port, protocol, packet size, geographic origin (e.g., city, country, continent), time of registration, owner or administrator information, average daily traffic over a specified time (e.g., last thirty days, last six months), and/or recent reputation in crowd-sourced intelligence. Features associated with the relationship between a parent process and its child process may include, e.g., the integrity level and/or the difference between the creation time of the two processes. Features associated with the relationship between a user and a machine may include, e.g., the logon type (e.g., remote, hands-on-keyboard, automated, etc.) and/or whether the user is a network administrator. Features associated with the relationship between a process and an IP address may include, e.g., the percentage of traffic occurring with standard vs. non-standard ports and/or whether any beaconing behavior is observed. In embodiments utilizing feature information of the entities and/or relationships, a featurizer (e.g., a software-implemented algorithm) can process the ingested raw features to create "transformed features" suitable as input into a machine-learning model, such as one-hot vectors or other encodings.

From the data tables 205 of entities, relationships, and optionally associated features, a graph 208 is generated for the incident. The graph represents entities as nodes, relationships between the nodes as edges, and any features associated with the entities or relationships as node or edge attributes. In various embodiments, the graph is multipartite, meaning that the nodes consists of distinct sets of nodes-here corresponding to different respective types of entities—and edges are formed only between nodes of different sets, that is, there are no intra-edges within each set of nodes. (Note that processes and sub-processes constitute different types corresponding to different sets of nodes.) In one beneficial example embodiment, the graph is four-partite, with nodes representing machines, processes, IP addresses, and domains, and four edge types reflecting the relationships machines and the process they spawn, processes and the domains to which they connect, domains and the IP addresses to which they resolve, and optionally directly the processes and the IP addresses to which they connect. In alternative embodiments, the graph may include multiple sets of nodes of different types, but allow for edges between two nodes of the same type (e.g., an edge between to nodes representing machines that have communicated with each other).

A suitable clustering technique is applied to the graph 208 to generate dense subgraphs, or clusters, 210. These clusters 210 are ranked based on some metric of "maliciousness," designed to identify one or more clusters that capture most of the malicious activity associated with the incident. This metric may be, for example, the number of security alerts associated with each cluster, such as the number of nodes within each cluster that represent security alerts in cases where alerts constitute one type of node, or otherwise the number of security alerts that show up as attributes of nodes (e.g., of machines or processes triggering them) within the cluster 210. Alternatively, the metric may be the number of IoCs among the nodes of each cluster. The IoCs may include, for example, certain IP addresses and domains that are known to pose cyberthreats. Similarly, they may include certain processes executing, e.g., viruses, worms, spyware, or other malware, or the file hashes (e.g., without limitation, hashes produced by a security hash algorithm (SHA) such as SHA-1, or message digest (MD) hashes like MD-5) and/or associated file signers of such processes. The metric may also utilize the sum or some other combination of the number of security alerts and IoCs. The ranking output is the highest-ranking (most malicious) cluster 212, or a set of multiple highest-ranking clusters 212 (e.g., all clusters with security alerts and/or IoCs above a specified threshold number). From the top cluster(s) 212, the data flow output is generated as a listing of nodes within the cluster(s) 212 that are potential IoCs. The data flow 200 may be implemented to include, in the listing, all nodes within the top cluster(s) 212, all nodes of one of more specified types (e.g., processes, domains, and IP addresses), or the top nodes as measured by some node-ranking criterion that may take the graph structure and/or node attributes into account. For example, the listing may be limited to nodes with a certain minimum number of edges.

In implementing the data flow 202, any of multiple suitable clustering algorithms may be utilized to generate the clusters 210 from the multipartite graph. Such clustering algorithms include, for example, Louvain clustering, k-means clustering based on Node2Vec embeddings or on unsupervised GraphSAGE embeddings, and spectral clustering. These techniques, among others, are all known to those of ordinary skill in the art.

Louvain clustering is an iterative process for creating clusters (also "communities") of nodes to maximize modularity, understood as the relative density of edges inside the clusters with respect to edges outside the clusters. For a graph with n nodes, the process may be initiated with n clusters, one for each node. In each iteration, for each node p, the modularity gain associated with moving p from its original community to a neighboring community is calculated, and communities, or clusters, are updated to maximize the modularity gain. Based on the updated clusters, a new graph is created in which each node represents a cluster, and edges between nodes represent the sum of edge weights within or between clusters. The process continues until no further modularity gain is possible.

Algorithms including k-means clustering aim at partitioning the n nodes into k clusters in a way such that each node belongs to the cluster with the nearest cluster center, the cluster center being the mean of the positions of all nodes within the cluster. Such clustering can be achieved, e.g., by a process of iterative refinement, where, starting from arbitrary initial cluster centers, in each iteration, nodes are assigned to the closest cluster, and the mean of node positions within the cluster is then updated based on the node assignments. The node positions upon which k-means clustering is based are represented by node vectors in a suitable embedding space.

In some embodiments, the k-means clustering algorithm operates on Node2Vec embeddings, which are generated by sampling a specified number of random walks of specified length through the graph, and then using the sampled random walks as input vectors to train a skip-gram neural network model. The weights across all nodes of the trained neural network that are associated with a given input vector component, corresponding to a given graph node, constitute the embedding for that node. In some embodiments, unsupervised GraphSAGE is utilized to compute the node embeddings for k-means clustering. GraphSAGE is an inductive framework for representation learning, with opensource implementations available, e.g., on GitHub. Like Node2Vec embeddings, GraphSAGE embeddings are computed from a specified number of random walks of specified length through the graph. From these random walks, "positive" node pairs that co-occur in the random walks are generated. Using a set of such positive node pairs, along with an equally large set of "negative" node pairs that do not co-occur in the random walks, a binary classifier model that predicts for any arbitrary node pair whether its two nodes are likely to co-occur is learned. The weights of the trained model are used as the embedding vectors of the nodes, which then flow into k-means clustering, as noted. Beneficially, GraphSAGE is inductive in that embeddings for new nodes (unseen during training) can be computed without having to retrain the model. Thus, GraphSAGE lends itself to clustering dynamic graphs.

Spectral clustering is a technique that takes advantage of the spectrum (eigenvalues) of the adjacency matrix or the affinity/similarity matrix of the graph to perform dimensionality reduction before clustering in fewer dimensions (e.g., using k-means clustering). The adjacency matrix encodes the presence or absence of an edge between any two nodes in the graph in a binary value, whereas the affinity or similarity matrix represents edges between nodes probabilistically (e.g., with numbers between zero and one), for instance, based on a metric of pairwise similarity between nodes. Spectral clustering involves calculating the n×n Laplacian of the adjacency matrix or the affinity/similarity matrix, and then determining the first l eigenvectors of the Laplacian ordered by the corresponding eigenvalue of each eigenvector. These eigenvectors are assembled into an n×l submatrix of the eigenmatrix of the Laplacian. Treating each row of that submatrix as a node, k-means clustering can then be applied, resulting in a clustering of all n nodes.

Figure 3:
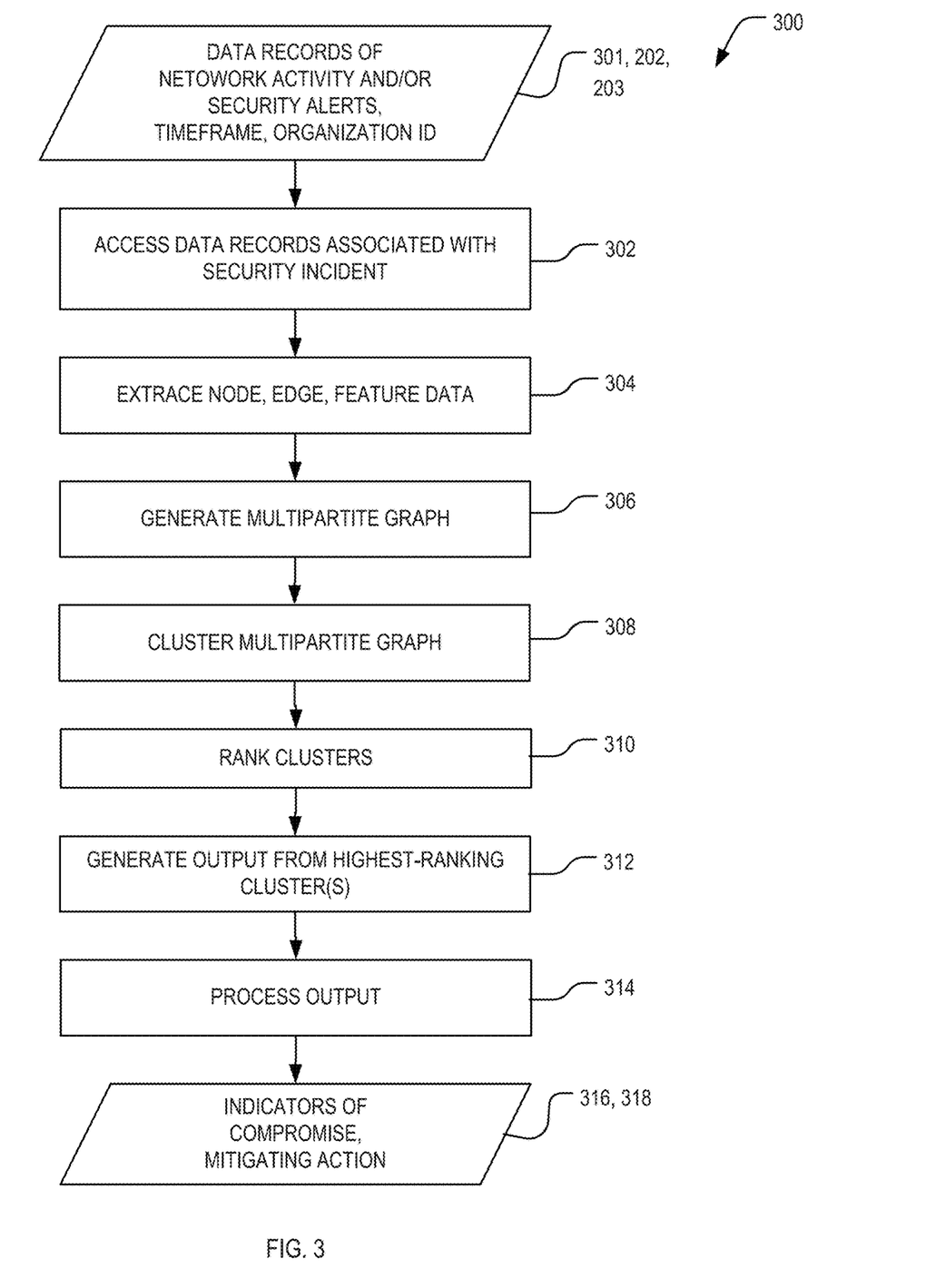
FIG. 3 is a flowchart of an example method for graph-based security incident analysis in accordance with various embodiments.

FIG. 3 is a flowchart of an example method 300 for graph-based security incident analysis in accordance with various embodiments. In particular embodiments, the security incident is a C2 incident. The method 300 involves accessing, at 302, data records of network activity and/or security alerts that have time stamps within a time period (herein synonymous with the "timeframe" 202) associated with the security incident and pertaining to an organization associated with the security incident. To the extent the data records are retrieved from a data repository that stores records for multiple organization, this step may include filtering the data records, e.g., based on an organization ID 203 provided as input, to retain only those pertaining to the organization associated with the security incident at issue. The time period, and if applicable the organization ID, may be extracted from, for example, a post-mortem report of an incident, as may be generated by security analysts using their threat-hunting experience and the security tools 130, or in some cases automatically by the tools 130.

From the relevant data records, node data identifying entities within the computer network and edge data identifying relationships between the entities is extracted at 304. In various embodiments, the node data includes data identifying machines within the computer network (e.g., by their machine IDs), processes spawned on the machines (e.g., by their process IDs), and network destinations external to the computer network connected to by the processes (e.g., by their domain names and/or IP addresses), and the edge data includes data identifying relations between the machines and the processes they have spawned and between the processes and the network destinations they have accessed. In some embodiments, the node data further includes data identifying users of the computer network (e.g., by their user names), child processes spawned by the processes (e.g., by their process IDs), image files associated with the processes (e.g., by their file hashes), file signers associated with the files (e.g., by their names), and/or security alerts (e.g., by their alert IDs). Optionally, feature vectors may be assigned to the nodes and/or edges based on feature data 206 of the entities and/or relationships extracted from the data records.

At 306, a graph (e.g., a multipartite graph) is generated from the extracted node and edge data. In the (multipartite) graph, the different types of entities (e.g., machines, processes, and network destinations) are represented as different types of nodes, the relationships between entities are represented as edges between the nodes, and the feature vectors are associated with the nodes or edges to which they pertain as attributes. To the extent the node data includes both domain names and IP addresses of the external network destinations, they may be represented as different respective types of nodes, with edges connecting domain names to the IP addresses to which they resolve.

The (multipartite) graphs is clustered at 308, using a graph-based clustering technique. In various embodiments, an unsupervised clustering technique, such as, e.g., spectral clustering, Louvain clustering, k-means clustering based on Node2Vec embeddings, or k-means clustering based on unsupervised GraphSAGE embeddings, is utilized. However, supervised or semi-supervised techniques may also be used in some embodiments. If feature data is extracted at 304, the clustering is based in part on the feature vectors assigned to the nodes and/or edges. The clusters are ranked, at 310, according to some metric of maliciousness, e.g., based on the number of security alerts associated with each cluster, the number of IoCs associated with each cluster, or a combination of both. An output generated from one or more highest-ranking clusters (i.e., clusters having the greatest associated number of security alerts or IoCs), e.g., an output listing of the nodes, or a subset of the nodes (e.g., the nodes with highest connectivity), within the highest-ranking cluster(s) is provided at 312.

The output may be further processed to obtain relevant security information or mitigate the incident at 314. For example, the listed nodes may be reviewed by a security analysist, or further analyzed programmatically by a computer, to identify one or more IoCs among them. The detected IoCs may include already known IoCs as well as new, previously undiscovered IoCs. Identifying IoCs is an essential part of cleaning up after a breach, as it allows security analysts and network administrators to identify infected machines and to block further incursions from the same attacker. Newly identified IoCs can help discover new modes of attack, and may be added to a library of IoCs (e.g., accessible by security tools 130), to be used in subsequent security monitoring. Previously known IoCs among the listed IoCs can be used to compute precision and recall of IoC detection based on the described cluster-based incident analysis. In some embodiments, a risk-mitigating action is taken based on the output listing. For example, machines that are among the listed nodes may be disconnected from the computer network, processes among the listed nodes may be aborted and associated files blocked, and destinations among the listed nodes may be blocked.

Figure 4:
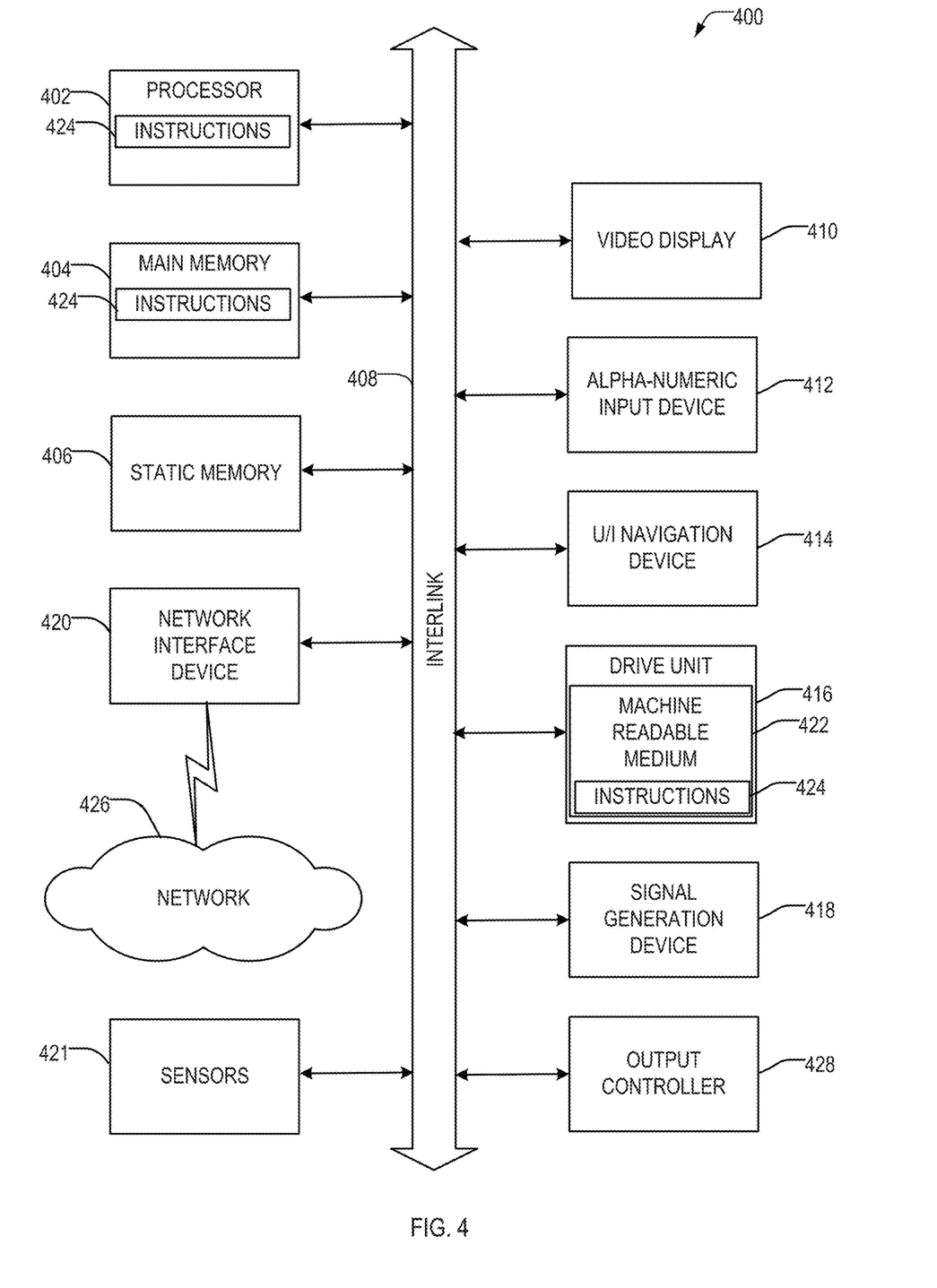
FIG. 4 is a block diagram of an example computing machine as may be used in implementing graph-based security incident analysis in accordance with various embodiments.

FIG. 4 is a block diagram of an example computing machine 400 as may be used in implementing graph-based security incident analysis in accordance with various embodiments. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a smartphone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

In various embodiments, machine(s) 400 may implement any portion of the systems and methods described above with reference to FIGS. 1-3. For example, with reference to FIG. 1, one or more machines 400 may implement any of computing machines 110, 112 and any of the security tools 130 and data repository 136. Further, machine(s) 400 may implement the incident analysis tool 138, e.g., by performing, in whole or in part, the workflow 200 and/or method 300 described above with reference to FIGS. 2 and 3.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 5400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine-readable medium 422 on which are stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine-readable media. While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that are not a transitory propagating signal.

The instructions 424 may further be transmitted or received over a communications network 426 using a transmission medium via the network interface device 420. The machine 400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

The embodiments described above may include or be implemented with a number of functional components or "modules." For example, within the a tool (e.g., incident analysis tool 138) executing the data flow 200 or method 300, different modules may include: a data extractor to access data records in a data repository and retrieve relevant node, edge, and feature data; a featurizer to create feature vectors for the nodes and/or edges; a graph generator to create a graph representation from the nodes and edges; a clustering component that implements a clustering technique to create subgraphs, or clusters, of the graph representation; a ranking component to rank the clusters by maliciousness; and an output generator to create, e.g., a listing of nodes from the highest-ranking clusters. Both software and hardware functionality may be organized or configured as modules. Software modules are sets of instructions that, when executed, cause the performance of specified operations. Hardware modules are tangible entities capable of performing specified operations, and may be configured or arranged in a certain manner. In an example, circuits may be arranged (e.g., internally or with respect to external entities such as other circuits) in a specified manner as a hardware module. In an example, the whole or part of one or more computer systems (e.g., a standalone, client or server computer system) or one or more hardware processors may be configured by firmware or software (e.g., instructions, an application portion, or an application) as a hardware module that operates to perform specified operations. In an example, the software may reside on a machine-readable medium. In an example, the software, when executed by the underlying hardware of the hardware module, causes the hardware to perform the specified operations. Accordingly, the term "hardware module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which hardware modules are temporarily configured, each of the hardware modules need not be instantiated at any one moment in time. For example, where the hardware modules comprise a general-purpose hardware processor configured using software, the general-purpose hardware processor may be configured as respective different hardware modules at different times. Software (e.g., different software modules) may accordingly configure a hardware processor, for example, to constitute a particular hardware module at one instance of time and to constitute a different hardware module at a different instance of time.

The following numbered examples are illustrative embodiments. Example 1 is a computer-implemented method, involving operations performed by one or more computer processors executing stored instructions, for analyzing a security incident detected in a computer network. The operations include accessing data records of network activity and/or security alerts having time stamps within a time period associated with the security incident and pertaining to an organization associated with the security incident, and extracting, from the data records, node data identifying machines within the computer network, processes spawned on the machines, and network destinations external to the computer network connected to by the processes, and edge data identifying relations between the machines and the processes they have spawned and between the processes and the network destinations they have accessed. The operations further include generation a multipartite graph based on the node and edge data; the multipartite graph represents the machines, processes, and network destinations as different types of nodes and the relations as edges between the nodes. Further, the operations involve identifying clusters within the multipartite graph with a graph-based clustering technique, ranking the clusters based on the number of security alerts and/or the number of known indicators of compromise (IoCs) associated with the respective clusters, and providing an output listing at least a subset of the nodes within one or more highest-ranking clusters.

Example 2 is the method of example 1, with an additional operations that identifies one or more new IoCs among the listed nodes.

Example 3 is the method of example 1 or example 2, where the operations further include causing a risk-mitigating action to be taken based on the output listing.

Example 4 is the method of example 3, wherein the risk-mitigating action includes one or more of the following: disconnecting a machine among the listed nodes from the computer network, aborting a process among the listed processes or blocking execution of a file associated with a listed process, or blocking a destination among the listed nodes.

Example 5 is the method of any of examples 1-4, wherein the node data identifying network destinations external to the computer network include destination IP addresses and destination domain names, and wherein the multipartite graph represents destination IP addresses and destination domain names as different node types.

Example 6 is the method of any of examples 1-5, wherein the node data further identifies at least one of users of the computer network, child processes spawned by the processes, file hashes associated with the processes, file signers associated with the file hashes, or the security alerts, and wherein the multipartite graph represents the users, child processes, file hashes, file signers, or security alerts as additional types of nodes different from the machines, processes, and network destinations.

Example 7 is the method of any of examples 1-6, wherein obtaining the data records involves filtering data records associated with multiple organizations to retain only data records pertaining to the organization associated with the security incident.

Example 8 is the method of any of examples 1-7, with additional operations including extracting feature data associated with the nodes and/or the edges from the data records, and assigning feature vectors to the nodes or edges based on the feature data. The clusters are, in this example, identified based in part on the feature vectors.

Example 9 is the method of any of examples 1-8, wherein the graph-based clustering technique is or includes spectral clustering, Louvain clustering, k-means clustering based on Node2Vec embeddings, and/or k-means clustering based on unsupervised GraphSAGE embeddings.

Example 10 is the method of any of examples 1-9, wherein the security incident is a command-and-control (C2) incident.

Example 11 is a system including hardware processing circuitry and one or more hardware memories storing instructions that, when executed, configure the hardware processing circuitry to perform operations for analyzing a security incident detected in a computer network to perform the method of any of examples 1-10.

Example 12 is a non-transitory computer-readable medium comprising instructions that, when executed, configure hardware processing circuitry to perform operations for analyzing a security incident detected in a computer network to perform the method of any of examples 1-10.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings, which form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A computer-implemented method for analyzing a security incident detected in a computer network, the method comprising executing, by one or more computer processors, instructions for performing operations comprising:
    accessing data records of at least one of network activity or security alerts having time stamps within a time period associated with the security incident and pertaining to an organization associated with the security incident;
    extracting, from the data records, node data identifying machines within the computer network, processes spawned on the machines, and network destinations external to the computer network connected to by the processes, and edge data identifying relations between the machines and the processes they have spawned and between the processes and the network destinations they have accessed;
    generating, based on the node and edge data, a multipartite graph representing the machines, processes, and network destinations as different types of nodes and the relations as edges between the nodes;
    identifying, with a graph-based clustering technique, subgraphs within the multipartite graph;
    ranking the subgraphs based on at least one of numbers of security alerts or numbers of known indicators of compromise (IoCs) associated with the subgraphs; and
    providing an output listing at least a subset of the nodes within one or more highest-ranking subgraphs.

2. The method of claim 1, the operations further comprising identifying one or more new IoCs among the listed nodes.

3. The method of claim 1, the operations further comprising causing a risk-mitigating action to be taken based on the output listing.

4. The method of claim 3, wherein the risk-mitigating action comprises at least one disconnecting a machine among the listed nodes from the computer network, aborting a process among the listed processes or blocking execution of a file associated with a listed process, or blocking a destination among the listed nodes.

5. The method of claim 1, wherein the node data identifying network destinations external to the computer network comprise destination IP addresses and destination domain names, and wherein the multipartite graph represents destination IP addresses and destination domain names as different node types.

6. The method of claim 1, wherein the node data further identifies at least one of users of the computer network, child processes spawned by the processes, file hashes associated with the processes, file signers associated with the file hashes, or the security alerts, and wherein the multipartite graph represents the users, child processes, file hashes, file signers, or security alerts as additional types of nodes different from the machines, processes, and network destinations.

7. The method of claim 1, wherein obtaining the data records comprises filtering data records associated with multiple organizations to retain only data records pertaining to the organization associated with the security incident.

8. The method of claim 1, the operations further comprising extracting, from the data records, feature data associated with at least one of the nodes or the edges, and assigning feature vectors to the nodes or edges based on the feature data, wherein the subgraphs are identified based in part on the feature vectors.

9. The method of claim 1, wherein the graph-based clustering technique comprises at least one of spectral clustering, Louvain clustering, k-means clustering based on Node2Vec embeddings, and k-means clustering based on unsupervised GraphSAGE embeddings.

10. The method of claim 1, wherein the security incident is a command-and-control (C2) incident.

11. A system comprising:
hardware processing circuitry; and
one or more hardware memories storing instructions that, when executed, configure the hardware processing circuitry to perform operations for analyzing a security incident detected in a computer network, the operations comprising:
accessing data records of at least one of network activity or security alerts having time stamps within a time period associated with the security incident and pertaining to an organization associated with the security incident;
extracting, from the data records, node data identifying machines within the computer network, processes spawned by the machines, and network destinations external to the computer network connected to by the processes, and edge data identifying relations between the machines and the processes they have spawned and between the processes and the network destinations they have accessed;
generating, based on the node and edge data, a multipartite graph representing the machines, processes, and network destinations as different types of nodes and the relations as edges between the nodes;
identifying, with a graph-based clustering technique, subgraphs within the multipartite graph;
ranking the subgraphs based on at least one of numbers of security alerts or numbers of known indicators of compromise (IoCs) associated with the subgraphs; and
providing an output listing at least a subset of the nodes within one or more highest-ranking subgraphs.

12. The system of claim 11, the operations further comprising identifying one or more new IoCs among the listed nodes.

13. The system of claim 11, the operations further comprising causing a risk-mitigating action to be taken based on the output listing.

14. The system of claim 13, wherein the risk-mitigating action comprises at least one disconnecting a machine among the listed nodes from the computer network, aborting a process among the listed processes or blocking execution of a file associated with a listed process, or blocking a destination among the listed nodes.

15. The system of claim 11, wherein the node data identifying network destinations external to the computer network comprise destination IP addresses and destination domain names, and wherein the multipartite graph represents destination IP addresses and destination domain names as different node types.

16. The system of claim 11, wherein the node data further identifies at least one of users of the computer network, child processes spawned by the processes, file hashes associated with the processes, file signers associated with the file hashes, or the security alerts, and wherein the multipartite graph represents the users, child processes, file hashes, file signers, or security alerts as additional types of nodes different from the machines, processes, and network destinations.

17. The system of claim 11, wherein obtaining the data records comprises filtering data records associated with multiple organizations to retain only data records pertaining to the organization associated with the security incident.

18. The system of claim 11, the operations further comprising extracting, from the data records, feature data associated with at least one of the nodes or the edges, and assigning feature vectors to the nodes or edges based on the feature data, wherein the subgraphs are identified based in part on the feature vectors.

19. The system of claim 11, wherein the graph-based clustering technique comprises at least one of spectral clustering, Louvain clustering, k-means clustering based on Node2Vec embeddings, and k-means clustering based on unsupervised GraphSAGE embeddings.

20. A non-transitory computer-readable medium comprising instructions that, when executed, configure hardware processing circuitry to perform operations for analyzing a security incident detected in a computer network, the operations comprising:
accessing data records of at least one of network activity or security alerts having time stamps within a time period associated with the security incident and pertaining to an organization associated with the security incident;
extracting, from the data records, node data identifying machines within the computer network, processes spawned by the machines, and network destinations external to the computer network connected to by the processes, and edge data identifying relations between the machines and the processes they have spawned and between the processes and the network destinations they have accessed;
generating, based on the node and edge data, a multipartite graph representing the machines, processes, and network destinations as different types of nodes and the relations as edges between the nodes;
identifying, with a graph-based clustering technique, subgraphs within the multipartite graph;
ranking the subgraphs based on at least one of numbers of security alerts or numbers of known indicators of compromise (IoCs) associated with the subgraphs; and
providing an output listing at least a subset of the nodes within one or more highest-ranking subgraphs.

* * * * *